(12) United States Patent
Fisher et al.

(10) Patent No.: US 12,272,199 B2
(45) Date of Patent: Apr. 8, 2025

(54) REALTY VIRTUAL ASSISTANT

(71) Applicant: SentriLock, LLC, Cincinnati, OH (US)

(72) Inventors: Scott R. Fisher, West Chester, OH (US); Charles P. Shroder, West Chester, OH (US)

(73) Assignee: SentriLock, LLC, Cincinnati, OH (US)

( * ) Notice: Subject to any disclaimer, the term of this patent is extended or adjusted under 35 U.S.C. 154(b) by 373 days.

(21) Appl. No.: 17/719,938

(22) Filed: Apr. 13, 2022

(65) Prior Publication Data
US 2022/0335551 A1 Oct. 20, 2022

Related U.S. Application Data

(60) Provisional application No. 63/174,734, filed on Apr. 14, 2021.

(51) Int. Cl.
| | |
|---|---|
| *G07C 9/27* | (2020.01) |
| *G06Q 30/0601* | (2023.01) |
| *G06Q 50/16* | (2012.01) |
| *G07C 9/00* | (2020.01) |
| *G07C 9/20* | (2020.01) |
| *H04W 12/06* | (2021.01) |
| *H04W 12/61* | (2021.01) |
| *H04W 12/63* | (2021.01) |
| *H04W 84/12* | (2009.01) |

(52) U.S. Cl.
CPC ............ *G07C 9/27* (2020.01); *G06Q 30/0617* (2013.01); *G06Q 30/0627* (2013.01); *G06Q 50/16* (2013.01); *G07C 9/00309* (2013.01); *G07C 9/00571* (2013.01); *G07C 9/00896* (2013.01); *G07C 9/215* (2020.01); *H04W 12/06* (2013.01); *H04W 12/61* (2021.01); *H04W 12/63* (2021.01); *H04W 84/12* (2013.01); *G07C 2009/00769* (2013.01); *G07C 2009/00936* (2013.01)

(58) Field of Classification Search
CPC .. G07C 9/27; G07C 9/00309; G07C 9/00571; G07C 9/00896; G07C 9/215; G06Q 30/0617; G06Q 50/16
See application file for complete search history.

(56) References Cited

U.S. PATENT DOCUMENTS

| | | | |
|---|---|---|---|
| 11,393,056 B1* | 7/2022 | Spickes | G01C 21/3415 |
| 2019/0287193 A1* | 9/2019 | Quagliata | G06F 16/27 |
| 2021/0366058 A1* | 11/2021 | Caballero | G06F 40/221 |
| 2022/0028015 A1* | 1/2022 | Stockdale | G06F 9/54 |

* cited by examiner

*Primary Examiner* — Vernal U Brown
(74) *Attorney, Agent, or Firm* — Frederick H. Gribbell; Russell F. Gribbell; William E. Crouse

(57) ABSTRACT

A realty virtual application for agents and clients. Agents and clients enter information into the application on their personal devices, and this information is stored on a central database. The application runs algorithms to find properties based on client preferences, and presents them to the agent in a report. The agent then sends these properties to the client through the application, and the client may accept or deny potential showing times. The client may also send messages to the agent, or give feedback or rate the property through the application. The client may share the property with friends or family through the application.

20 Claims, 5 Drawing Sheets

REALTY VIRTUAL ASSISTANT

CROSS-REFERENCE TO RELATED APPLICATIONS

The present application claims priority to provisional patent application Ser. No. 63/174,734, titled "REALTY VIRTUAL ASSISTANT," filed on Apr. 14, 2021.

TECHNICAL FIELD

The technology disclosed herein relates generally to real estate applications and is particularly directed to a realty virtual assistant application for use both by a real estate agent and a real estate client, which includes at least two wireless portable computers, and a central clearinghouse computer, in which the realty virtual assistant application communicates over a WAN (wide area network) with all of those devices. Embodiments are specifically disclosed as an agent interface that allows an agent to input data into the realty virtual assistant application for tracking a client's potential real estate buying interests, and for communicating with that client.

A further embodiment is disclosed as a client interface that allows a client to input data into the realty virtual assistant application for communication with an agent, or for communicating information with friends related to a specific property.

Embodiments are also disclosed as a realty virtual assistant application that automatically sends requests from the agent interface to the client interface, and vice versa. The realty virtual assistant application can determine information about a specific property by gathering MLS (multiple listing service) data (e.g., based on a specific location), a physical address (entered by a client or agent), or GPS (global positioning system) data (e.g., based on the location of the client's or agent's wireless portable computer while using the app). Such data gathered may include the identification of the agent for that property, the identification of the client (as a sales prospect), and other data available about that property (e.g., price, neighborhood, local schools, etc.).

The realty virtual assistant application will provide an overall improvement in the performance of the computer systems, as compared to current technology, by combining various sources of information about properties into a single data set that will be presented to a human user, upon request. In particular, MLS data can be acquired, potentially by sales agents or by sales prospects, from various published sources, and other forms of data about properties can be acquired from a central computer that is owned or controlled by a company that manages electronic lockboxes. If a sales agent or a sales prospect learns of an MLS listing, for example, that agent or prospect can communicate information about that MLS listing to the other person, and the sales agent or sales prospect can then upload that information to the central computer, where that information about a specific property can then be added into the overall database that is maintained by that central computer. Later, the sales agent (or perhaps a different sales agent) can then download that specific property information to the sales prospect (or perhaps to a different sales prospect), as well as having the capability to include—in the same data set (i.e., in the same downloaded message)—other specific property information about yet other properties that may be of interest to that sales prospect.

The MLS data can also be used to fill in information about specific properties that were already stored in the database of the central computer, for example. When a sales agent places an electronic lockbox at a specific property, that sales agent becomes the "listing agent" for that property. For that lockbox, and that property, to become registered in the central computer's database, that listing agent must supply a certain minimum amount of information about that property, which then is stored in the central computer's database—and is then associated with that property. (The central computer's database is typically a relational database, in which various types of information are arranged in tables by types of attributes about a multitude of properties, so that searches for specific types of attributes can be performed by system users—typically prospective customers (e.g., sales prospects), or various potential "showing agents." Note: the "sales agents" that are discussed herein are typically "showing agents," who personally conduct a "showing" for a sales prospect at a listed property.) MLS data, created and maintained by a real estate "board," may contain additional information about that same property and, therefore, if MLS data is combined with the data provided by the listing agent, the central computer can then be enriched with further information about that property, and that additional information can be stored in the relational database of the central computer.

STATEMENT REGARDING FEDERALLY SPONSORED RESEARCH OR DEVELOPMENT

None.

BACKGROUND

Virtual assistant (VA) programs are widely used by smart phone users. Apple's Siri, Microsoft's Cortana, Amazon's Alexa, and Google's Google Assistant are all well-known examples of VAs. These VA programs are commonly used for routine tasks, such as ordering items, finding locations, or setting appointments. However, none of these are dedicated to the real estate industry, nor do they integrate in any capacity with real estate equipment, such as lockboxes.

These commonly used VA programs are also primarily used for individual goals. Of course, these VA programs link query's to external programs such as Google Maps, or Bing, to locate answers to the questions asked of them. But these VA programs typically do not interconnect and communicate between specific users for real estate showings and other related communications, which is necessary in the client/agent relationship used in the real estate industry.

SUMMARY

Accordingly, it is an advantage to provide a realty virtual assistant application that can be utilized by both a real estate agent and a prospective real estate buyer, which facilitates communication between the agent and the buyer, while providing scheduling and showing functions for prospective real estate listings.

It is another advantage to provide realty virtual assistant application for use by a prospective client, in which the client can enter data to narrow down real estate interests, or enter specific physical addresses. The client may also receive and respond to showings, offers, or other communications from an agent. The realty virtual assistant application also allows the client to rate properties, or share comments regarding properties with friends.

It is yet another advantage to provide a realty virtual assistant application for use by a real estate agent, in which the agent can enter potential client data, listing and showing agent data, and property data. The agent may also send listings to clients, schedule appointments for showings, or communicate offers to clients.

It is still another advantage to provide a realty virtual assistant application that can determine information about a property based on physical address, GPS location, MLS data, showing agent name, listing agent name, or potential prospect name.

It is a further advantage to provide a realty virtual assistant application that can gather pertinent information that meets predetermined attributes about one or more properties that have been listed in the MLS (Multiple Listing Service) database of a particular geographic region, and also that can gather other pertinent information about those same one or more pertinent properties, and then compile a "combined data" about each one of those same one or more pertinent properties and create a report that contains that combined data that can be reviewed by a real estate agent, such as a showing agent, and then sent by that agent to a prospective customer (a "client" or a "sales prospect") for review by that client.

It is a yet further advantage to provide a realty virtual assistant application that can gather pertinent information that meets predetermined attributes about one or more properties that have been listed in the MLS (Multiple Listing Service) database of a particular geographic region, especially if those are "new listings," and to store that information into a portion of a database used by a central computer for a system of electronic lockboxes, and then create a report containing that information about pertinent properties which can be reviewed by a real estate agent, such as a showing agent, and then sent by that agent to a prospective customer (a "client" or a "sales prospect") for review by that client.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a realty virtual assistant application system is provided, which comprises: (a) a first wireless portable computer that includes a first processing circuit, a first memory circuit that includes instructions executable by the first processing circuit, a first display, a user operated first data entry circuit, and a first WAN communications circuit for communicating with a wide area network; (b) a second wireless portable computer that includes a second processing circuit, a second memory circuit that includes instructions executable by the second processing circuit, a second display, a user operated second data entry circuit, and a second WAN communications circuit for communicating with the wide area network; and (c) a central computer that includes a third processing circuit, a third memory circuit that includes instructions executable by the third processing circuit and that contains at least one database, and a third WAN communications circuit for communicating with the wide area network, wherein the at least one database includes a first portion to store data pertaining to at least one property and a second portion to store data pertaining to at least one sales prospect; wherein the first, second, and third processing circuits are configured: (d) at the first wireless portable computer, the first data entry circuit is used to input data pertaining to a particular sales prospect of the at least one sales prospect, and the first WAN communications circuit is used to send a first message to the central computer; (e) at the second wireless portable computer, the second data entry circuit is used to input data pertaining to the at least one property, and the second WAN communications circuit is used to send a second message to the central computer; (f) at the central computer, (i) the third WAN communications circuit is used to receive the first and second messages; (ii) the third memory circuit is used to store the first and second messages; (iii) the third processing circuit is used to generate a list of available showings that are automatically selected from the data pertaining to the at least one property and, based upon information provided by the particular sales prospect, selected from input data pertaining to the particular sales prospect; and (iv) the third WAN communications circuit is used to send the list of available showings to the first wireless portable computer; (g) at the first wireless portable computer, (i) the first WAN communications circuit is used to receive the list of available showings from the central computer; and (ii) the first WAN communications circuit is used to send the list of available showings to the second wireless portable computer; (h) at the second wireless portable computer, the second WAN communications circuit is used to receive the list of available showings, and to send a third message that either confirms or denies interest in at least one showing of the list of available showings, as determined by the particular sales prospect; and (i) at the first wireless portable computer: (i) the first WAN communications circuit is used to receive the third message; (ii) the first WAN communications circuit is used to communicate with the central computer to schedule a showing for a particular property corresponding to the confirmed interest; and (iii) the first WAN communications circuit is used to receive authorization credentials that are necessary to obtain access to the particular property.

In accordance with another aspect, a method for using a realty virtual assistant application system is provided, in which the method comprises the following steps: (a) providing a first wireless portable computer including a first processing circuit, a first memory circuit including instructions executable by the first processing circuit, a first display, a first user operated data entry circuit, and a first WAN communications circuit for communicating with a wide area network; (b) providing a second wireless portable computer including a second processing circuit, a second memory circuit including instructions executable by the second processing circuit, a second display, a second user operated data entry circuit, and a second WAN communications circuit for communicating with the wide area network; and (c) providing a central computer including a third processing circuit, a third memory circuit including instructions executable by the third processing circuit and containing at least one database, and a third WAN communications circuit for communicating with the wide area network, wherein the at least one database includes a first portion storing data pertaining to at least one property and a second portion storing data pertaining to at least one sales prospect; wherein the first, second, and third processing circuits are configured to perform functions of: (d) at the first wireless portable computer, inputting data pertaining to a particular sales prospect of at least one sales prospect using the first data entry circuit and sending a first message to the central computer; (e) at the second wireless portable computer, inputting data pertaining to at least one property using the second data entry circuit and sending a second message to the central computer; (f) at the central computer, (i) receiving the first and second message using the third WAN communications circuit; (ii) storing the first and second message using the third memory circuit; (iii) generating, using the third processing circuit, a list of available showings that are automatically selected from the data pertaining to at least one property and, based upon information provided by the particular sales prospect, selected from input data pertaining to the particular sales prospect; and (iv) sending the list of available showings to the first wireless portable computer; (g) at the first wireless portable computer, receiving the list of available showings from the central computer and sending the list of available showings to the second wireless portable computer; and (h) at the second wireless portable computer, receiving the list of available showings and sending a third message that either confirms or denies interest in at least one showing of the list of available showings, as determined by the particular sales prospect; and (i) at the first wireless portable computer: (i) receiving the third message; (ii) communicating with the central computer to schedule a showing for a particular property corresponding to the confirmed interest; and (iii) receiving authorization credentials that are necessary to obtain access to the particular property.

In accordance with yet another aspect, a method for method for using a realty virtual assistant application system is provided, in which the method comprises the following steps: (a) providing a first wireless portable computer that includes a first processing circuit, a first memory circuit that includes instructions executable by the first processing circuit, a first display, a user operated first data entry circuit, and a first WAN communications circuit for communicating with a wide area network; and (b) providing a central computer that includes a second processing circuit, a second memory circuit that includes instructions executable by the second processing circuit and that contains at least one central database, and a second WAN communications circuit for communicating with the wide area network, wherein the at least one central database includes a first portion to store data pertaining to at least one property and a second portion to store data pertaining to at least one sales prospect; (c) providing access to a remote third party database that contains information pertaining to at least one property; wherein the first and second processing circuits are configured to perform functions of: (d) at the first wireless portable computer: (i) inputting data pertaining to a sales prospect by use of the first data entry circuit; (ii) accessing the remote third party database by use of the first WAN communications circuit to search for at least one pertinent property that meets predetermined attributes as selected by the sales prospect; (iii) sending a first message to the central computer, the first message including information pertaining to the sales prospect, and including information about search results for the at least one pertinent property that meets the predetermined attributes; (e) at the central computer: (i) receiving the first message at the second WAN communications circuit; (ii) searching the at least one central database to search for at least one pertinent property that meets the predetermined attributes as selected by the sales prospect; (iii) generating, using the second processing circuit, a list of properties that includes both search results from searching the at least one central database and the search results contained in the first message; (iv) generating, using the second processing circuit, a list of available showings that correspond to the list of properties; and (v) sending a second message to the first wireless portable computer, the second message including the list of available showings; and (f) at the first wireless portable computer: (i) receiving the second message at the first WAN communications circuit; (ii) allowing a sales agent to view the list of available showings on the first display, and to select at least one available showing for at least one of the at least one pertinent property from the list of available showings; and (iii) sending the selected at least one available showing in a third message to a second wireless portable computer, using the first WAN communications circuit.

In accordance with still another aspect, a method for using a realty virtual assistant application system is provided, in which the method comprises the following steps: (a) providing a first wireless portable computer that includes a first processing circuit, a first memory circuit that includes instructions executable by the first processing circuit, a first display, a user operated first data entry circuit, and a first WAN communications circuit for communicating with a wide area network; and (b) providing a central computer that includes a second processing circuit, a second memory circuit that includes instructions executable by the second processing circuit and that contains at least one central database, and a second WAN communications circuit for communicating with the wide area network, wherein the at least one central database includes a first portion to store data that pertains to at least one property and a second portion to store data that pertains to at least one sales prospect; wherein the first and second processing circuits are configured to perform functions of: (c) at the first wireless portable computer: (i) inputting data, by use of the first data entry circuit, that describes predetermined attributes about a property, as selected by a sales prospect; (ii) accessing the at least one central database by use of the first WAN communications circuit to send a search request for at least one pertinent property that meets the predetermined attributes; (d) at the central computer: (i) receiving the search request, by use of the second WAN communications circuit; (ii) searching the at least one central database for at least one pertinent property that meets the predetermined attributes as selected by the at least one sales prospect; (iii) generating, using the second processing circuit, a list of at least one pertinent property that meets the predetermined attributes, due to the search request; (iv) sending a first message to the first wireless portable computer that includes the list of at least one pertinent property that meets the predetermined attributes, the list including identifying information about each of the at least one pertinent property; (e) at the first wireless portable computer: (i) viewing and selecting at least one of the at least one pertinent property, using the identifying information on the first display; (ii) sending a second message to the central computer to send a request for a showing pertaining to the at least one pertinent property; and (f) at the central computer: (i) receiving the second message containing the request for a showing, by use of the second WAN communications circuit; and (ii) sending the request for a showing pertaining to the at least one pertinent property to a second wireless portable computer for further action.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
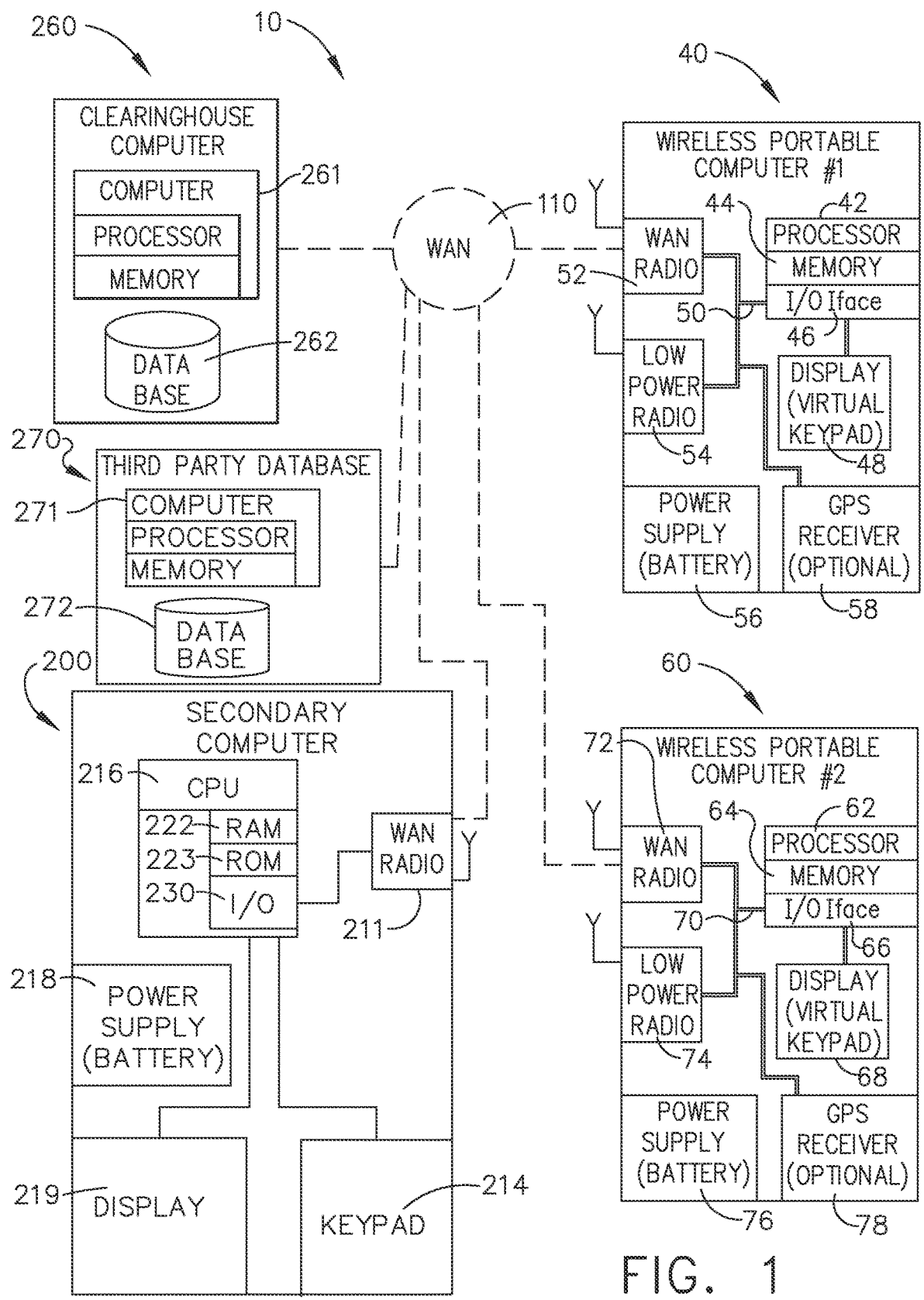
FIG. 1 is a diagrammatic view of the major components of a realty virtual assistant system, including a central computer station, a first wireless portable computer (Wireless portable computer #1), a second wireless portable computer (Wireless portable computer #2), and a secondary computer, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer, while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

It will be understood that the term "agent" as used herein can represent a sales agent in general, or a real estate sales agent in particular. It will also be understood that the term "client" as used herein can represent a sales prospect in general, or a real estate client in particular.

Referring now to FIG. 1, a realty virtual assistant application system, generally designated by the reference numeral 10, is depicted. The system 10 includes a central clearinghouse computer system 260 (also referred to as a "CCC"), a first wireless data communications system 110 that comprises a wide area network, two wireless portable computers 40 and 60, and a secondary computer 200. The central clearinghouse computer 260 typically will include a database 262 containing a repository of electronic lockbox identification and attribute information, and also contains a repository of information about real estate agents. The database 262 also typically includes sales prospect data. A computer 261 controls the database 262, and includes a processing circuit and a memory circuit, as well as other typical devices that are part of a computing center, including many WAN communications lines to talk with multiple users, virtually simultaneously. It should be noted that the database 262 will typically require a large amount of computer servers, or some other form of bulk memory storage.

Secondary computer 200 includes a microprocessor (CPU) 216, and this computer (or processing circuit) also is coupled to random access memory 222, read only memory 223, and an input/output interface circuit 230. The secondary computer 200 also includes a display 219, a keypad 214, a power supply 218 (typically a battery), and a wide area network (WAN) radio 211. The WAN radio 211 can also be placed in communication with the wide area network 110, and therefore, can communicate with the clearinghouse computer 260, or the wireless portable computers 40 and 60 as desired.

As described above, the secondary computer 200 could be constructed as a standard commercial device, such as a wireless laptop or tablet computer, a wired (or wireless) desktop computer, or an Internet-compatible cellular telephone (or "smart phone"), for example. The secondary computer 200 is an optional office or home computer that a real estate agent (or sales prospect) may use in lieu of smart device, such as a smart phone. The secondary computer 200 may be used with a physical keyboard and large external monitor to access the realty virtual assistant application system 10 for easier entry of data. The WAN radio 211 could be a WiFi radio, which is in communication with a wireless router or wireless modem that then connects to the Internet (i.e., the WAN 110).

The first wireless portable computer 40 typically includes a processing circuit 42, a memory circuit 44, and an input/output interface circuit 46, as well as a display 48. One typical wireless portable computer that could be used would be a smart phone, and most smart phones have a touch screen display, which can act as a virtual keypad. Some type of user input device will be necessary, so if a virtual keypad is not part of the display 48, then some other type of input keypad or at least a numeric keypad (such as a telephone keypad) would be needed. Regardless of its exact physical form, the (virtual) keypad will also be referred to herein as a "user operated data entry circuit." The wireless portable computer 40 also has a signal or data bus 50 that transfers signals from the I/O interface 46 to a wide area network radio 52, and a low power radio 54. The wireless portable computer typically also contains some type of electrical power supply 56, such as a battery. An optional GPS (global positioning system) receiver 58 may be included in the wireless portable computer.

The second wireless portable computer 60 typically also contains similar circuitry, including a processing circuit 62, a memory circuit 64, and I/O interface circuit 66, and a display 68 (which could include a virtual keypad). This wireless portable computer also has a signal or data bus 70 that connects the I/O interface to a wide area network radio 72 and a low power radio 74. The second wireless portable computer typically also includes an electrical power supply 76. An optional GPS receiver 78 may be included in the wireless portable computer.

If the first and second wireless portable computers 40 and 60 are both smart phones, then their wide area radios 52 and 72 would essentially be cellular telephones, and could connect to the wide area network 110, typically via some type of cellular tower. The clearinghouse computer 260 would also be able to connect into the cellular tower network via the Internet in most situations.

In addition to the database 262 at the central computer 260, the overall system described herein will have the capability of accessing information from other computer databases, referred to herein as a "third party database." Such third party databases would typically be controlled by a third party computer system 270, which would include a rather sophisticated computer system 270 that typically would be physically remote from the Central Clearinghouse Computer 260, and would therefore require a communications link with the wide area network 110 (e.g., the Internet). This remote system 270 would include a computer 271 that comprises a central processing unit and a memory, and further would include a database 272 that contains a repository of information about many different real properties. The computer processing circuit at 271 controls the database 272, and the overall third party computer system 270 will act as a computing center, and typically will include many WAN communications lines to 'talk' with multiple users, virtually simultaneously.

An example of the third party computer system 270 is a regional real estate Board MLS (Multiple Listing Service) computer that contains an MLS database of 'listed' real properties that are for sale, or for lease, in the local geographic region. The properties that have been listed are essentially published by the various real estate brokers that are members of the local real estate Board, and potential customers (buyers or lessors) are encouraged to inspect the data that is stored in the MLS database (e.g., database 272). It should be noted that the database 272 will typically require a large amount of computer servers, or some other form of bulk memory storage.

In a typical situation, a new listing is posted by a real estate agent (the "listing agent") into the MLS database, and that listing agent is typically a member of one of the real estate brokerage firms, which itself is a member of that local real estate Board. (This is a typical requirement for any listing agent to be able to access the MLS database to post a new listing.) Once the listing has been posted to the MLS database, potential buyers/lessors (sales "prospects") can access that new listing information, usually over the Internet, by inspecting the website of that listing agent's real estate brokerage firm. In general, anyone with Internet access can inspect this MLS data, with or without providing any contact information. If someone decides they want more information, or if they want to attend a "showing" of a specific property, then that person would then need to provide some minimum contact information (such as a telephone number or an e-mail address) and, thereby, become a "user" of the MLS and/or real estate broker system. One of the real estate agents would then respond to that inquiry, or if the user already knows one of the real estate agents, that user can enter data to be paired up with that sales agent in the brokerage computer system.

It should be understood that each MLS system will typically have its own computer system, or it will 'rent' computing power from another third party provider, typically over the Internet. The MLS database could, thus, exist as a self-contained computer system, as illustrated in FIG. 1 (e.g., the system 270), or it could be in the "cloud" which is more and more likely to be the case in the future. In addition to the MLS computer system 270, each realty company (the real estate broker) will also likely have its own computer system, or will 'rent' computing power from yet another third party provider, and will likely maintain its own database, either in virtual form (e.g., in the 'cloud') or in its own hardware. Potentially, the real estate broker could rent space from the MLS computer system, if the local real estate Board allows for that type of system.

As a minimum, each real estate broker will likely have its own website, and its actual computing power and database could literally be almost anywhere in the world, including in the 'cloud.' When a potential customer accesses the broker's website to look for properties that are for sale or lease, the overall system may well access the MLS database 272 in a transparent manner—in other words, even though the user is inspecting the MLS database 272, the user will only think that he/she is looking at the real estate broker's computer records. In that manner, the memory and processing power for the broker's website would be minimized, while providing access to many various properties that have been posted on the MLS database.

As is common knowledge today, when a sales prospect looks for a possible real estate property to buy or lease, that prospect can search for various listed properties using one or more attributes, such as price range, school district, number of bedrooms, with or without a garage, etc. Some, or all, of these attributes (or 'features') of a real property can be stored in the Central Clearinghouse Computer 260 when a listing agent emplaces and registers an electronic lockbox for a new property listing. Moreover, some or all of these attributes can be stored in the MLS database 272. Depending on the listing agent's diligence, or preference, certain attributes may be entered into one of the databases 262 or 272, but perhaps not into both of them—at least not initially. It would be advantageous for 'missing data' to be semi-automatically transferred from one of these databases into the other—see below for more details on this point.

Figure 2:
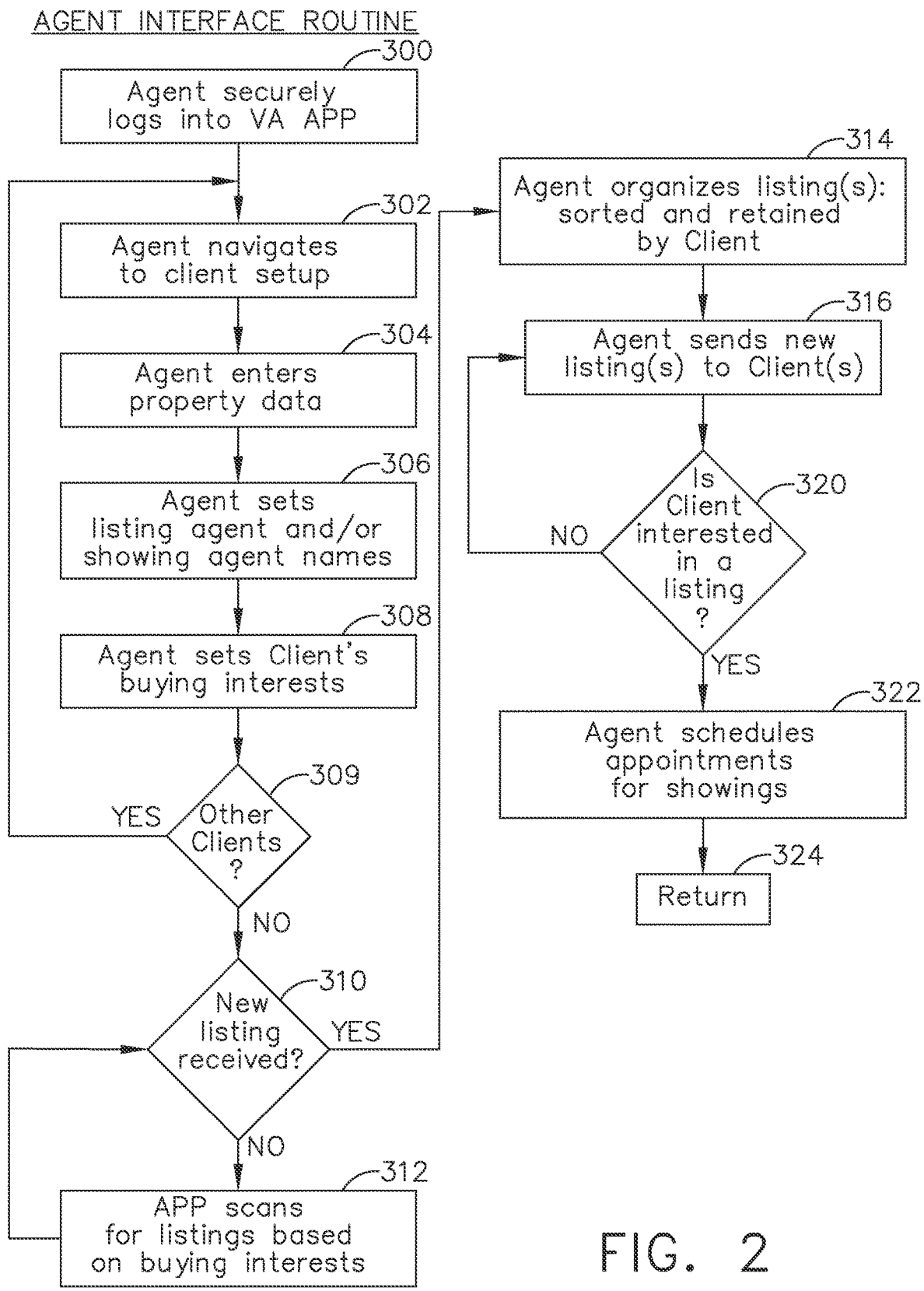
FIG. 2 is a flow chart of some of the important the steps performed by the agent interface routine of the realty virtual assistant system of FIG. 1.

Referring now to FIG. 2, certain logic or functional steps of an agent interface routine (or "agent interface") of the realty virtual assistant application system 10 are depicted as a flow chart. First, at a step 300, an agent securely logs into the realty virtual assistant application. Note that the agent may already be an authorized user in the system 10, and as such this is merely a routine login for security purposes. If the agent is not already an authorized user in the system 10, then the agent will need to request access, either through the system 10 or through a local board of realtors. Once logged in, at a step 302, the agent navigates through the application to a client setup subsystem.

At a step 304, once in the client setup subsystem, the agent will enter property data. This property data may include the address of the property, GPS data (if available), local school districts, physical data about the property (such as acreage or permanent structure information), and other important data points regarding that property's neighborhood. This step 304 may also include entering personal information for the client as well, such as a person's name and contact information. Step 304 may be completed at a later time, and will not hamper the effectiveness of the agent interface, if skipped for now.

Next, at a step 306, the agent enters information regarding a listing agent and/or a showing agent. Of course, the listing agent and showing agent could be the same person. This information is important because most of this data gets uploaded to the MLS and to the central computer 260. Other real estate agents (or prospective clients browsing websites such as realtor.com, for example) can search properties where the listing agent name is displayed, which facilitates what realty company to contact (such as Sibcy Cline or Re/Max, for example, or another real estate broker) for showings.

At a step 308, the agent enters information regarding a specific client's buying interests. Such interests may include attributes such as price range, property location, a particular school district, commute times, and other similar data. Note that these initial steps 304-308 may be used to setup multiple clients, and the realty virtual assistant application system 10 stores identifying information for each client and that client's related data.

If the agent has any further clients to enter at this time, a decision step 309 will ask for that status, and the logic flow will be diverted accordingly, either back to step 302, or to additional functions.

Next, at a decision step 310, the system determines if a new listing has been received. New listings may be received from various sources. For example, the client themselves could indicate properties they want to visit, or the agent may be notified by other agents of new listings. The realty virtual assistant application system 10, using the parameters entered in the previous steps, may send potential listings to the agent and/or the client. If no new listing has been received, then at a step 312 the realty virtual assistant application system 10 scans for listings based on the buying interests of the client. The system 10 then returns to step 310 and continues checking if a new listing has been received. (It is assumed that the realty virtual assistant application system 10 is used in a multi-tasking operating system, and therefore, the system 10 performs in real time other tasks in addition to retuning to step 310, for example)

However, if a new listing has been received, then at a step 314 the agent interface automatically organizes the new listing and generates a report for the agent to review. This report may be sorted, and retained, per client. The report generated by the system includes property information from various sources, such as the client, other agents, the central computer 260, or the MLS. The system collects this property data based on the client's property interests (i.e., the attributes noted above), and then correlates that data into a report that is generated and sent to the agent for review. This report will contain at least one pertinent property that meets the client's property interests.

In this way, the agent is able to quickly view the generated report and determine the next course of action for each client. Retained client reports may be used to calculate trends, or show a specific listing 'search history' for a particular client. Based on the new listing received (or multiple new listings), at a step 316, the agent may send the new listing(s) to the client(s) in the form of a generated report. Note that such generated reports can combine several listed properties as 'search results' into that single report (potentially one report for each individual client), and data about each of those listed properties can be obtained from more than one database as the source of original data. This type of 'combined report' is an improvement in the overall real estate computer operating system, because such 'combined reports' have not been available in conventional listing services working in combination with conventional central computers that control electronic lockboxes.

A decision step 320 now determines if any of the clients have responded to the new listing(s), and if any one of the clients has expressed an interest in attending a showing. If not, then the system returns to step 316 in which the agent continues to send potential listings to the client, as new listings occur. The "client" will also be referred to herein as a "sales prospect" and the "specific client's buying interests" will also be referred to herein as "data pertaining to at least one property." When a client enters information about his or her buying interests, that function can also be referred to as creating "input data pertaining to at least one property."

The methodology for determining whether or not a client is interested in attending a showing for a given property would be presented to the client on his/her smart phone— e.g., the wireless portable computer 60 (see FIG. 1). If more than one property is available for a showing, based upon the client's buying interests, then a 'list' of those properties would be sent to the client's smart phone and presenting on the display. The client will then be able to select which of those properties (if any) he/she is sufficiently interested in to schedule a showing with the sales agent. The smart phone display 68 will give the client a choice, such as to either "confirm" or "deny" an interest is scheduling at least one showing of the list of available showings.

If the client is interested in one, or more, listings, then at a step 322 the agent schedules an appointment for a showing (or multiple showings) for the interested properties. Last, at a step 324, the agent interface returns to other functions. More specifically, the central computer can generate a list of "available showings," and that list can be automatically selected from the client's input data pertaining to at least one property, which was earlier entered by the client (i.e., the sales prospect). The available showings are a key to more efficiently managing the client's time, as well as the sales agent's time; and of course, the property owner (or the dweller, if that is a different person from the owner) must have provided some time windows that would be acceptable to offer such available showing time periods at the physical property.

Assuming the client has an interest in scheduling at least one showing, that interest will be sent in a message to the sales agent, and this agent will communicate a request to schedule a showing for that particular property in which the client confirmed an interest. Part of this overall system includes security measures for the physical property, and the central computer 260 manages a large number of electronic lockboxes that protect each of the properties in a particular real estate sales region—under the guise of a real estate Board. After the sales agent receives confirmation of an appointment time for the requested showing, the sales agent will typically send a message to the sales prospect (the client) to inform that client of the now-scheduled appointment time for that showing.

Modern electronic lockboxes are accessed by authorized sales agents who must present authorization credential to the lockbox to obtain access to the protected property. It will be understood that the 'best' lockbox systems will include electronic keys (e.g., the smart phone 40 on FIG. 1) that must be periodically renewed (or 'rejuvenated') to correctly function with an electronic lockbox; in other words, the electronic keys will automatically expire with the passage of time, unless they are periodically renewed by a procedure known to the sales agents of a given regional real estate Board. But, in addition to this time-expiring feature, for "showing by appointment," the sales agent must arrive at the physical property to access the electronic lockbox withing a predetermined tolerance of time to obtain access; this is an additional real time restriction that is imposed by the scheduled showing.

Figure 3:
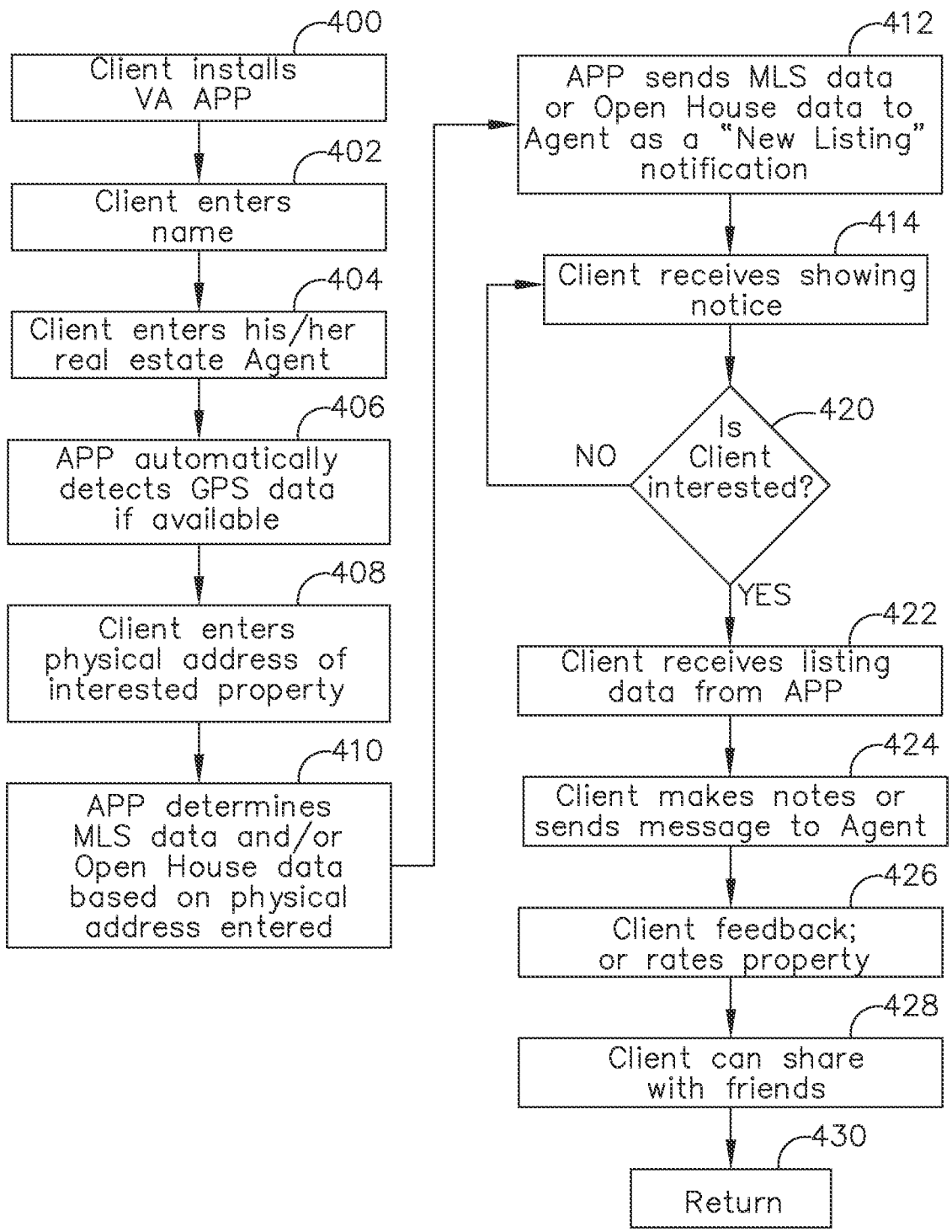
FIG. 3 is a flow chart of some of the important the steps performed by the client interface routine of the realty virtual assistant system of FIG. 1.

Referring now to FIG. 3, certain steps of a client interface routine (or "client interface") of the realty virtual assistant application system 10 are depicted. First, at a step 400, the client installs the realty virtual assistant application on his or her wireless portable computer or smart device. This application will likely be listed as a "Realty Client App," for example, and be available for installation in various app storefronts (such as Google Play for Android phones, or the App Store for iPhones, for example). Alternatively, the application may also be available through a download link sent by an agent to a client for use on a desktop or laptop computer. This download link would be used to open a webpage where the client could set up credentials for using the webpage. The webpage would have similar features compared to the smart phone app, and could also be accessed through a smart phone web browser if the client does not wish to install the app. (It should be noted that a download link for a smart device would direct the user to that smart device's app store, and install the application from that app store.)

Next, at a step 402, the client enters his or her name and other contact information. At a step 404, the client enters his or her real estate agent. These two steps 402 and 404 allow the realty virtual assistant system 10 database to link the client with the real estate agent, so that the agent may review some (or all) of the client's data for help in finding properties to visit.

Optionally, at a step 406, the client interface may automatically detect GPS data, if available. Typically, smart phone apps will prompt the user to allow for GPS tracking, and if accepted, then the client interface will use the client's smart phone's GPS receiver to determine the location of the property of interest that is nearest the location of the phone during the data entry process.

Alternatively, at a step 408, the client may instead manually enter the physical address of the property he or she is interested in, instead of using the automatic GPS detection in step 406. Of course, both steps can be used in case the GPS detects the wrong address, or the GPS may correct the manually entered address if, for example, the user may only have the house number and not know the street name.

Next, at a step 410, the client interface determines the MLS data (or open house data) based on the physical address entered (either automatically through GPS detection, or manually entered as mentioned above). It should be noted that although this realty virtual assistant application system 10 is designed to work with SentriLock databases and lockboxes, once the client interface determines the MLS data through the physical address, all of the information about that property is available, regardless of what lockbox or central computer system is used. For example, a property using a non-SentriLock lockbox may still be determined based on the property's address. The MLS data will provide the client interface with the ID of the associated realty, the ID of the seller, and other associated data about that property (such as the listing agent). In other words, through the use of the client interface of the realty virtual assistant application system 10, the system would be universally compatible with all real estate brokers (e.g., real estate agents and real estate Boards) and all property listings available in the MLS.

At a step 412, the client interface sends this acquired MLS data or open house data to the agent interface as a new listing notification. This use of the client interface is a more efficient way to notify an agent about a potential property showing. Traditionally, a client would have to call their agent if he or she found a property to visit. The agent would then have to look up the information about the property. However, the user of the realty virtual assistant application system 10 streamlines this process. The client would log in to the client interface, enter the address of the property, and the agent automatically would receive all the information about that property through the agent interface. And, as will be further discussed below, setting up a showing would also be partially automated through the use of this system 10.

After the client has expressed an interest, the client receives a showing notice at a step 414. Note that this also is the follow-up step from step 316 on FIG. 2 in the agent interface (the agent sends a listing to the client). Since these actions are accomplished in each respective app, there is no need for back and forth text messaging or leaving voice messages. The client interface receives the notice and holds it until the client views it, and the agent interface performs in a similar manner.

At a decision step 420, the client determines his or her interest in attending a showing, or receiving further information about this listing. If the client decides to decline, then the system logic waits for another new listing at step 414. (Again, the operating system is multitasking.) However, if the client accepts, then at a step 422 the client receives listing data from the client interface. This data will include the standard information for property listings on the MLS, such as acreage, building information, tax history, school districts, etc.

At a step 424, the client may make notes regarding the property, or send messages to the agent. Such messages or notes could include a message that the client will be delayed on arrival for the showing, or questions regarding the property that may not be determined based on the acquired MLS data from step 422.

At a step 426, the client may leave feedback or otherwise rate the property. Then at a step 428, the client may share some information about the property to friends or family Last, at a step 430, the client interface returns to other functions.

Figure 4:
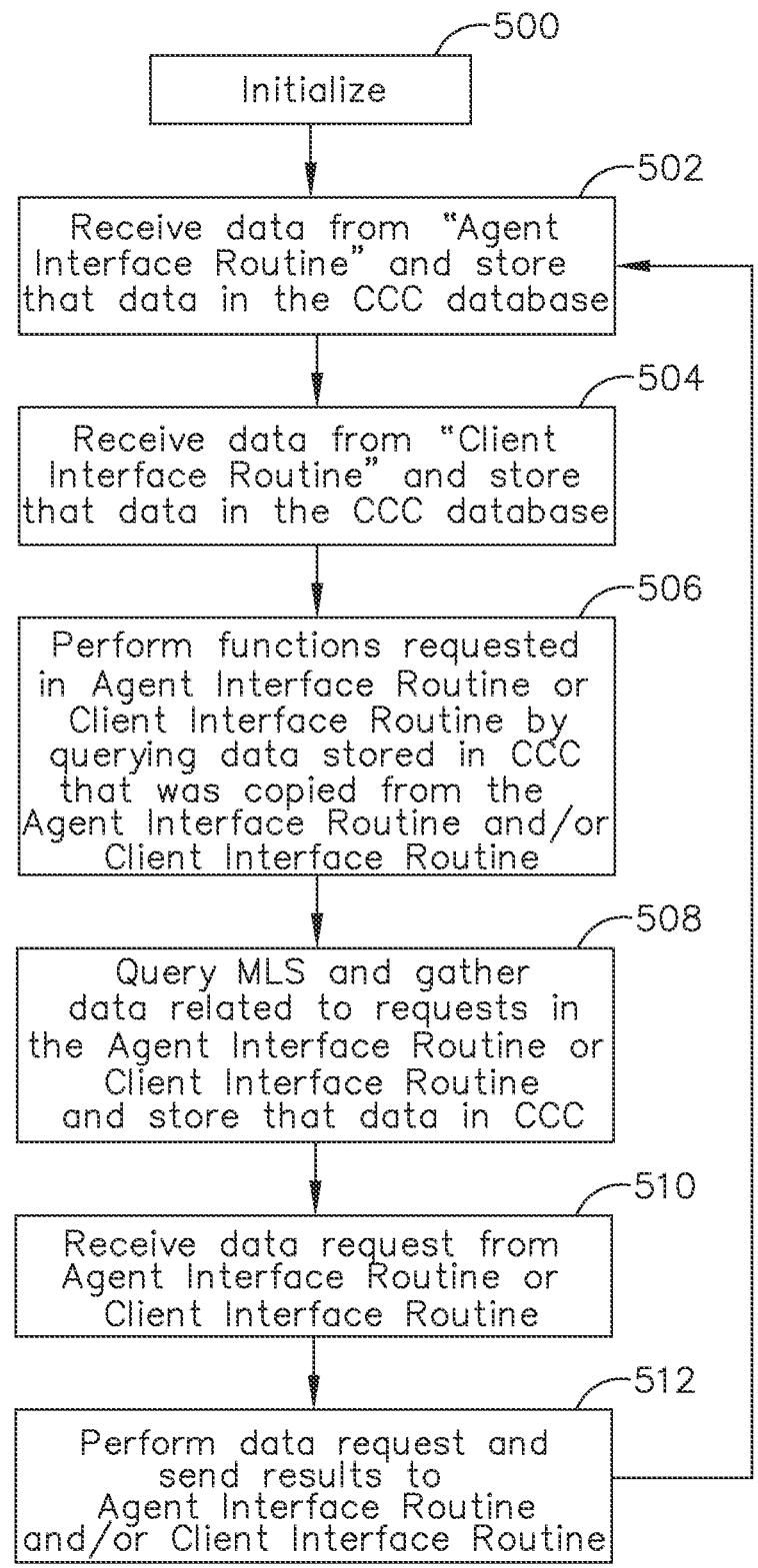
FIG. 4 is a flow chart of some of the important the steps performed by the virtual assistant backend routine of the realty virtual assistant system of FIG. 1.

Referring now to FIG. 4, certain steps of a virtual assistant backend routine (or "virtual assistant app") of the realty virtual assistant system 10 are depicted as a flow chart. These steps are typically executed on the CCC 260, which performs as a backend server coordinating and storing all the information being exchanged between the agent interface and the client interface, for the various agents and clients using the system 10.

First, at a step 500, the virtual assistant backend routine is initialized on the CCC 260. Next, at a step 502, the virtual assistant backend routine receives data from the agent interface, and stores that received data in the CCC database 262. As discussed above, this data may include property data, listing and showing agent data, and client data, for example, as well as other pertinent information.

At a step 504, the virtual assistant backend routine receives data from the client interface, and stores that data in the CCC database 262. This data may include client data or property data, for example, as discussed above, and potentially including client feedback or client questions.

Then, at a step 506, the CCC 260 performs certain functions requested in the agent interface and/or the client interface by querying data stored in the CCC database 262, based on the data copied from steps 502 and 504. These functions may include searching the database for properties based on the client's interests, such as previously determined property attributes (from step 308 on FIG. 2).

At a step 508, the CCC 260 queries the MLS for a particular sales region and gathers data related to requests generated in the agent interface and client interface, and then stores that data in the CCC database 262. This is an important step, because the MLS data will usually fill in any gaps in the property information that were missing from the CCC database 262. By combining the MLS data with the previously-existing data for a specific property (or for a plurality of properties), the performance of the overall computer system thereby becomes automatically improved, since all of the "combined data" for that property can then be found in a single database, and moreover, all of that "combined data" for that property can later be downloaded to a sales prospect in a single message.

Next, at a step 510, the virtual assistant backend routine receives a data request from the agent interface or the client interface (or both). This data request is automatically generated by the agent interface and the client interface. The agent interface is typically querying for new listings at step 310 on FIG. 2 or sending listings to clients at step 316 on FIG. 2, whereas the client interface is typically sending property data at step 412 on FIG. 3 or responding to showing notices at step 420 on FIG. 3.

At a step 512, the virtual assistant backend routine performs the appropriate action to respond to the data request from step 510, and sends the results to the agent interface and/or the client interface. Typical results include the organized listings at step 314 on FIG. 2 in the agent interface, or listing data for a showing at step 422 on FIG. 3 in the client interface. After reporting the results, the virtual assistant backend routine returns to step 502 and continually repeats the steps illustrated in FIG. 4. (The CCC 260 is also assumed to run on a multitasking operating system.)

Overview of Integration with Existing Applications

The realty virtual assistant application system is primarily intended to be used within a SentriLock lockbox REALTOR® environment. Local REALTOR associations around the United States decide what lockbox provider to partner with to provide security and ease of use for buying and selling properties. However, each REALTOR association may have dozens of member real estate sales companies (such as Sibcy Cline or Re/Max noted above, among many others). These individual sales companies may already provide their own software applications for agents and clients to use during the process of buying and selling properties, but this plurality of non-integrated software applications can become a difficult and technological challenge to work through for both agents and clients. However, by using the realty virtual assistant application system disclosed herein, every REALTOR agent and client can use a single application that works with any MLS property on the market. This enhanced capability represents an improvement in the overall performance of the computer systems, as compared to the currently existing technology.

Because the realty virtual assistant application system provides a user interface to the SentriLock CCC database (which already contains data on properties utilizing SentriLock lockboxes), and has the capability to query and pull data from the MLS regional database, the realty virtual assistant application system is able to provide nearly every tool for an agent/client relationship. Using the realty virtual assistant system to integrate client and agent communication, along with lockbox management, will provide flexibility and ease of use for clients no matter what real estate agent they choose to use. Again, this is an enhanced capability that represents an improvement in the overall performance of the computer systems, as compared to the currently existing technology. The types of information that are available in an MLS regional database can thus be combined with the types of information that are available in the central computer of an electronic lockbox provider, such as SentriLock, LLC, thereby creating a set of "combined data" that may be stored in the central computer, if desired. Later, that combined data can be downloaded to potential customers (e.g., to a "sales prospect") in messages communicated by cell phone or WiFi technology, for example.

Since agents will already be using the existing SentriLock application for operating SentriLock lockboxes, the realty virtual assistant application system will seamlessly integrate into that existing application. Not only will agents have full control over their lockboxes, but they will also gain full reporting and communication capabilities to their clients by using this single application. As stated above, a combination of information from more than one original data source can ultimately be communicated from sales agents to sales prospects in a single e-mail or text message, for example. That "combined data" can be stored in the central computer's database, once the MLS data is introduced to the central computer, by whatever method is used to upload that MLS data to the central computer. This represents a significant improvement in the overall performance of the computer systems involved.

Figure 5:
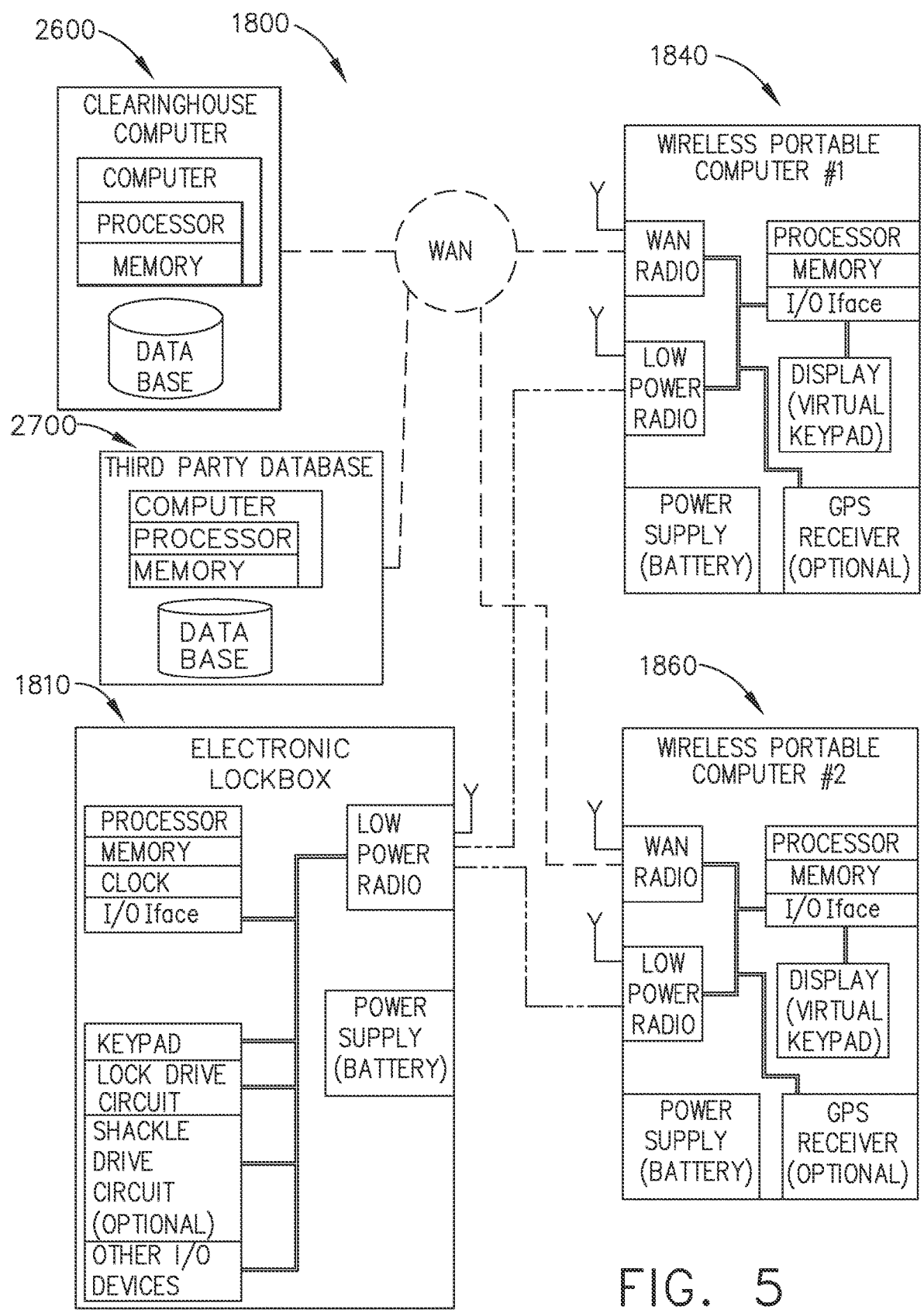
FIG. 5 is a diagrammatic view of the major components of a realty virtual assistant system, including a central computer station, a first wireless portable computer (Wireless portable computer #1), a second wireless portable computer (Wireless portable computer #2), and an electronic lockbox, as constructed according to the principles of the technology disclosed herein.

FIG. 5 illustrates a realty virtual assistant system that is very similar to that described above, in reference to FIG. 1, in which the entire system is generally designated by the reference numeral 1800. As in FIG. 1, this system 1800 also includes a central computer 2600 (the "Clearinghouse Computer"), a first wireless portable computer 1840, a second wireless portable computer 1860, and a third party database 2700. In addition, an electronic lockbox 1810 is included in this system 1800, rather than a "secondary computer." The lockbox 1810 can be accessed by at least one of the wireless portable computers, as in a typical electronic lockbox system, via the lockbox's low power radio.

It will be understood that the logical operations described in relation to the flow charts of FIGS. 2-4 can be implemented using sequential logic (such as by using microprocessor technology), or using a logic state machine, or perhaps by discrete logic; it even could be implemented using parallel processors. One preferred embodiment may use a microprocessor or microcontroller to execute software instructions that are stored in memory cells within an ASIC. In fact, the entire microprocessor (and microcontroller, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a microcomputer, a microcontroller, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information, or perhaps by a type of memory device not yet invented. In general, the memory circuit of a particular electronic product will contain instructions that are executable by the processing circuit of that same particular electronic product.

It will also be understood that the precise logical operations depicted in the flow charts of FIGS. 2-4, and discussed above, could be somewhat modified to perform similar, although perhaps not exact, functions without departing from the principles of the technology disclosed herein. The exact nature of some of the decision steps and other commands in these flow charts are directed toward specific future models of realty virtual assistant systems (those involving applications provided by SentriLock, LLC, for example) and certainly similar, but somewhat different, steps would be taken for use with other applications or realty virtual assistant systems in many instances, with the overall inventive results being the same.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

Some additional information about "basic" lockbox embodiments, including advanced features, are more fully described in earlier patent documents by some of the same inventors, and assigned to SentriLock, Inc. or SentriLock LLC, including: U.S. Pat. No. 7,009,489, issued Mar. 7, 2006, for ELECTRONIC LOCK SYSTEM AND METHOD FOR ITS USE; U.S. Pat. No. 6,989,732, issued Jan. 24, 2006, for ELECTRONIC LOCK SYSTEM AND METHOD FOR ITS USE WITH CARD ONLY MODE; U.S. Pat. No. 7,086,258, issued Aug. 8, 2006, for ELECTRONIC LOCK BOX WITH SINGLE LINEAR ACTUATOR OPERATING TWO DIFFERENT LATCHING MECHANISMS; U.S. Pat. No. 7,420,456, issued Sep. 2, 2008, for ELECTRONIC LOCK BOX WITH MULTIPLE MODES AND SECURITY STATES; U.S. Pat. No. 7,193,503, issued Mar. 20, 2007, for ELECTRONIC LOCK SYSTEM AND METHOD FOR ITS USE WITH A SECURE MEMORY CARD; U.S. Pat. No. 7,999,656, issued Aug. 16, 2011, for ELECTRONIC LOCK BOX WITH KEY PRESENCE SENSING; U.S. Pat. No. 7,734,068, issued Jun. 8, 2010, for ELECTRONIC LOCK BOX USING A BIOMETRIC IDENTIFICATION DEVICE; U.S. Pat. No. 8,451,088, issued May 28, 2013, for ELECTRONIC LOCK BOX WITH TRANSPONDER BASED COMMUNICATIONS; U.S. Pat. No. 8,164,419, issued Apr. 24, 2012, for ELECTRONIC LOCK BOX WITH TIME-RELATED DATA ENCRYPTION BASED ON USER-SELECTED PIN; U.S. Pat. No. 8,151,608, issued Apr. 10, 2012, for ELECTRONIC LOCK BOX WITH MECHANISM IMMOBILIZER FEATURES; U.S. Pat. No. 9,208,466, issued on Nov. 18, 2015, for ELECTRONIC LOCK BOX SYSTEM WITH INCENTIVIZED FEEDBACK; U.S. Pat. No. 8,593,252, issued Nov. 26, 2013, for ELECTRONIC LOCK BOX PROXIMITY ACCESS CONTROL; U.S. Pat. No. 8,912,884, issued Dec. 16, 2014, for ELECTRONIC KEY LOCKOUT CONTROL IN LOCKBOX SYSTEM; U.S. Pat. No. 9,053,629, issued on May 20, 2015, for CONTEXTUAL DATA DELIVERY TO MOBILE USERS RESPONSIVE TO ACCESS OF AN ELECTRONIC LOCKBOX; U.S. Pat. No. 9,478,083, issued on Oct. 5, 2016, for ELECTRONIC KEY LOCKOUT CONTROL IN LOCKBOX SYSTEM; U.S. Pat. No. 9,704,315, issued on Jun. 21, 2017, for CONTEXTUAL DATA DELIVERY TO OTHER USERS AT AN ELECTRONIC LOCKBOX; U.S. Pat. No. 10,068,399, issued on Aug. 21, 2018, for CONTEXTUAL DATA DELIVERY TO OTHER USERS AT AN ELECTRONIC LOCKBOX; U.S. Pat. No. 10,026,250, issued on Jun. 27, 2018, for CONTEXTUAL DATA DELIVERY TO USERS AT A LOCKED PROPERTY; U.S. Patent Application No. 2020-0308870 A1, published on Oct. 1, 2020, for ELECTRONIC LOCKBOX; U.S. Pat. No. 10,846,964 issued on Nov. 24, 2020, for ELECTRONIC LOCKBOX WITH INTERFACE TO OTHER ELECTRONIC LOCKS; and U.S. Patent Application No. 2021-0027559 A1, published on Jan. 28, 2021, for ELECTRONIC LOCKBOX WITH SCHEDULE CONTROLLED ACCESS CREDENTIALS. These patent documents are incorporated by reference herein, in their entirety.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A realty virtual assistant application system, said system comprising:
   (a) a first wireless portable computer that includes a first processing circuit, a first memory circuit that includes instructions executable by said first processing circuit, a first display, a user operated first data entry circuit, and a first WAN communications circuit for communicating with a wide area network, wherein the first wireless portable computer is used by a sales agent;
   (b) a second wireless portable computer that includes a second processing circuit, a second memory circuit that includes instructions executable by said second processing circuit, a second display, a user operated second data entry circuit, and a second WAN communications circuit for communicating with said wide area network, wherein the second wireless portable computer is used by a particular sales prospect, in which the particular sales prospect is a different person than the sales agent; and
   (c) a central computer that includes a third processing circuit, a third memory circuit that includes instructions executable by said third processing circuit and that contains at least one database, and a third WAN communications circuit for communicating with said wide area network, wherein said at least one database includes a first portion to store property data pertaining to at least one property and a second portion to store client data pertaining to a buying interest of at least one sales prospect;
   wherein said first, second, and third processing circuits are configured:
   (d) at said first wireless portable computer, said first data entry circuit is used to input the client data pertaining to the buying interest of the particular sales prospect, and said first WAN communications circuit is used to send a first message to said central computer, the first message containing the client data;
   (e) at said central computer,
      (i) said third WAN communications circuit is used to receive said first message;
      (ii) said third memory circuit is used to store said first message including the input client data pertaining to the buying interest of the particular sales prospect in the second portion of the said at least one database;
      (iii) said third processing circuit is used to generate a list of available showing times that are automatically selected from proper data pertaining to the input client data pertaining to the buying interest of the particular sales prospect, which includes the property data for a specific property of said at least one property, based upon contents of said first message; and
      (iv) said third WAN communications circuit is used to send said list of available showing times pertaining to said specific property to said first wireless portable computer;
   (f) at said first wireless portable computer,
      (i) said first WAN communications circuit is used to receive said list of available showing times pertaining to said specific property from said central computer; and
      (ii) said first WAN communications circuit is used to send said list of available showing times pertaining to said specific property to said second wireless portable computer;
   (g) at said second wireless portable computer, said second WAN communications circuit is used to receive said list of available showing times pertaining to said specific property, and to send a second message that either confirms or denies interest in at least one showing time of said list of available showing times, as determined by said particular sales prospect; and
   (h) at said first wireless portable computer:
      (i) said first WAN communications circuit is used to receive said second message;
      (ii) if the particular sales prospect has confirmed interest in the at least one showing time for the specific property, then said first WAN communications circuit is used to communicate with said central computer to schedule the at least one showing time for the specific property corresponding to the confirmed interest; and
      (iii) said first WAN communications circuit is used to receive authorization credentials that are necessary to obtain access to said specific property.

2. The system of claim 1, further comprising:
   (a) a first short range wireless communications circuit controlled by the first processing circuit of said first wireless portable computer; and
   (b) a second short range wireless communications circuit controlled by the second processing circuit of said second wireless portable computer.

3. The system of claim 1, wherein: said authorization credentials allow the sales agent to obtain access to an electronic lockbox protecting said specific property.

4. The system of claim 1, wherein:
(a) said second wireless portable computer includes a global positioning system (GPS) receiver; and
(b) said second processing circuit and said user operated second data entry circuit are used to communicate with said global positioning system (GPS) receiver to determine a physical address pertaining to the specific property.

5. The system of claim 1, wherein:
(a) at said second wireless portable computer, said user operated second data entry circuit is used to input a physical address pertaining to the specific property;
(b) said second WAN communications circuit is used to send said physical address to said central computer;
(c) at said central computer, said third WAN communications circuit is used to receive said physical address; and
(d) at said central computer, said third processing circuit is used to use said physical address to determine multiple listing service data or open house data pertaining to said physical address.

6. The system of claim 1 wherein:
(a) at said first wireless portable computer, said user operated first data entry circuit is used to input the property data for the specific property;
(b) said WAN communications circuit is used to send said property data for the specific property to said central computer;
(c) at said central computer, said third WAN communications circuit is used to receive said property data for the specific property, and said third memory circuit is used to store said property data for the specific property.

7. The system of claim 1 wherein: said first wireless portable computer contains periodically renewable time-expiring authorization credentials to access an electronic lockbox protecting said specific property, in addition to any real time restrictions imposed by said scheduled showing time.

8. A method for using a realty virtual assistant application system, said method comprising:
(a) providing a first wireless portable computer including a first processing circuit, a first memory circuit including instructions executable by said first processing circuit, a first display, a first user operated data entry circuit, and a first WAN communications circuit for communicating with a wide area network, wherein the first wireless portable computer is used by a sales agent;
(b) providing a second wireless portable computer including a second processing circuit, a second memory circuit including instructions executable by said second processing circuit, a second display, a second user operated data entry circuit, and a second WAN communications circuit for communicating with said wide area network, wherein the second wireless portable computer is used by a particular sales prospect, in which the particular sales prospect is a different person than the sales agent; and
(c) providing a central computer including a third processing circuit, a third memory circuit including instructions executable by said third processing circuit and containing at least one database, and a third WAN communications circuit for communicating with said wide area network, wherein said at least one database includes a first portion storing property data pertaining to at least one property and a second portion storing client data pertaining to at least one buying interest of at least one sales prospect;
wherein said first, second, and third processing circuits are configured to perform functions of:
(d) at said first wireless portable computer, inputting the client data pertaining to said at least one buying interest of the particular sales prospect of the at least one sales prospect using said first data entry circuit and sending a first message to said central computer;
(e) at said first wireless portable computer, inputting data pertaining to a specific property of the at least one property, using said first data entry circuit and sending a second message to said central computer;
(f) at said central computer,
  (i) receiving said first and second message using said third WAN communications circuit;
  (ii) storing said first and second message using said third memory circuit;
  (iii) generating, using said third processing circuit, a list of available showing times that are automatically selected from said property data pertaining to the specific property and the client data pertaining to said at least one buying interest of the particular sales prospect; and
  (iv) sending said list of available showing times to said first wireless portable computer;
(g) at said first wireless portable computer, receiving said list of available showing times from said central computer and sending said list of available showing times to said second wireless portable computer; and
(h) at said second wireless portable computer, receiving said list of available showing times and sending a third message that either confirms or denies interest in at least one showing time of said list of available showing times, as determined by said particular sales prospect; and
(i) at said first wireless portable computer:
  (i) receiving said third message;
  (ii) communicating with said central computer to schedule the showing time for the specific property corresponding to the confirmed interest; and
  (iii) receiving authorization credentials that are necessary to obtain access to said specific property.

9. The method of claim 8, wherein: said authorization credentials allow an authorized sales agent to obtain access to an electronic lockbox protecting said specific property.

10. The method of claim 8, wherein:
(a) including a global positioning system (GPS) receiver at said second wireless portable computer; and
(b) using said second processing circuit and said user operated second data entry circuit to communicate with said global positioning system (GPS) receiver to determine a physical address pertaining to the specific property.

11. The method of claim 8, wherein:
(a) inputting a physical address pertaining to the specific property at said second wireless portable computer, using said user operated second data entry circuit;
(b) sending said physical address to said central computer;
(c) receiving said physical address at said central computer; and
(d) at said central computer, using said physical address to determine multiple listing service data or open house data pertaining to said physical address.

12. The method of claim 8, wherein: said first wireless portable computer contains periodically renewable time-expiring authorization credentials to access an electronic lockbox protecting said specific property, in addition to any real time restrictions imposed by said scheduled showing time.

13. A method for using a realty virtual assistant application system, said method comprising:
    (a) providing a first wireless portable computer that includes a first processing circuit, a first memory circuit that includes instructions executable by said first processing circuit, a first display, a user operated first data entry circuit, and a first WAN communications circuit for communicating with a wide area network, wherein the first wireless portable computer is used by a sales agent; and
    (b) providing a central computer that includes a second processing circuit, a second memory circuit that includes instructions executable by said second processing circuit and that contains at least one central database, and a second WAN communications circuit for communicating with said wide area network, wherein said at least one central database includes a first portion to store data pertaining to at least one property and a second portion to store client data pertaining to at least one buying interest of at least one sales prospect;
    (c) providing access to a remote third party database that contains information pertaining to said at least one property;
    wherein said first and second processing circuits are configured to perform functions of:
    (d) at said first wireless portable computer:
        (i) inputting client data pertaining to said at least one buying interest of a sales prospect by use of said first data entry circuit;
        (ii) accessing said remote third party database by use of said first WAN communications circuit to search for at least one specific property that includes property data that matches the client data;
        (iii) sending a first message to said central computer, said first message including the client data;
    (e) at said central computer:
        (i) receiving said first message at said second WAN communications circuit;
        (ii) searching said at least one central database to search for the at least one specific property that includes the property data that matches said the client data;
        (iii) generating, using said second processing circuit, a list of properties that includes the property data that matches the client data contained in said first message;
        (iv) generating, using said second processing circuit, a list of available showing times that correspond to said list of properties; and
        (v) sending a second message to said first wireless portable computer, said second message including said list of available showing times; and
    (f) at said first wireless portable computer:
        (i) receiving said second message at said first WAN communications circuit;
        (ii) allowing the sales agent to view said list of available showing times on said first display, and to select at least two available showing times for the specific property of said at least one specific property from said list of available showing times; and
        (iii) sending said selected at least two available showing times in a third message to a second wireless portable computer, wherein the second wireless portable computer is used by a particular sales prospect, in which the sales prospect is a different person than the sales agent using said first WAN communications circuit.

14. The method of claim 13, wherein:
    (a) said second wireless portable computer includes a third processing circuit, a third memory circuit that includes instructions executable by said third processing circuit, a second display, a user operated second data entry circuit, and a third WAN communications circuit for communicating with said wide area network;
    (b) at said second wireless portable computer, receiving said third message containing the selected at least two available showing times, using said third WAN communications circuit; and
    (c) allowing said sales prospect to view said at least two available showing times, and to confirm or to deny interest in at least one showing time of the two available showing times, by sending a fourth message to said first wireless portable computer, using said third WAN communications circuit.

15. The method of claim 13, wherein: said remote third party database is a Multiple Listing Service (MLS) database that contains information about a plurality of real properties.

16. The method of claim 13, wherein: said remote third party database is controlled by a regional real estate Board, and includes:
    (a) a fourth processing circuit;
    (b) a fourth memory circuit that includes instructions executable by said fourth processing circuit;
    (c) a fourth WAN communications circuit for communicating with said wide area network; and
    (d) a bulk memory store that contains data pertaining to a plurality of real properties.

17. The method of claim 13, wherein: said remote third party database is an Open House database that contains information about a plurality of real properties that are scheduled for an open house.

18. A method for using a realty virtual assistant application system, said method comprising:
    (a) providing a first wireless portable computer that includes a first processing circuit, a first memory circuit that includes instructions executable by said first processing circuit, a first display, a user operated first data entry circuit, and a first WAN communications circuit for communicating with a wide area network, wherein the first wireless portable computer is used by a sales agent; and
    (b) providing a central computer that includes a second processing circuit, a second memory circuit that includes instructions executable by said second processing circuit and that contains at least one central database, and a second WAN communications circuit for communicating with said wide area network, wherein said at least one central database includes a first portion to store property data that pertains to at least one property and a second portion to store client data that pertains to at least one sales prospect;
    wherein said first and second processing circuits are configured to perform functions of:
    (c) at said first wireless portable computer:
        (i) inputting the client data, by use of said first data entry circuit, that describes predetermined attributes that are desirable to a sales prospect about a property, as selected by a particular sales prospect;
        (ii) accessing said at least one central database by use of said first WAN communications circuit to send a search request for at least one specific property that meets said predetermined attributes;

(d) at said central computer:
- (i) receiving said search request, by use of said second WAN communications circuit;
- (ii) searching said at least one central database for the at least one specific property that meets said predetermined attributes as selected by said at least one sales prospect;
- (iii) generating, using said second processing circuit, a list of the at least one specific property that meets said predetermined attributes, due to said search request;
- (iv) sending a first message to said first wireless portable computer that includes said list of at least one specific property that meets said predetermined attributes, said list including identifying information about each of said at least one specific property;

(e) at said first wireless portable computer:
- (i) viewing and selecting at least one of said at least one specific property, using said identifying information on said first display;
- (ii) sending a second message to said central computer to send a request for showing times pertaining to said at least one specific property; and (f) at said central computer:
- (i) receiving said second message containing the request for the showing times, by use of said second WAN communications circuit; and
- (ii) sending said request for the showing times pertaining to said at least one specific property to a second wireless portable computer for further action, wherein the second wireless portable computer is used by the particular sales prospect, in which the particular sales prospect is a different person than the sales agent.

19. The method of claim 18, further comprising:

(a) providing access to a remote third party database that contains information pertaining to said at least one specific property;
  wherein said first and second processing circuits are configured to perform functions of:

(b) at said first wireless portable computer:
- (i) accessing said remote third party database by use of said first WAN communications circuit to search for the at least one specific property that corresponds with the client data;
- (ii) sending a third message to said central computer, said third message including information pertaining to said sales prospect, and including information about search results for said at least one specific property that corresponds with the client data;
- (iii) sending a fourth message to said central computer to request the showing times pertaining to said at least one specific property; and (f) at said central computer:
- (i) receiving said fourth message containing the request for the showing times, by use of said second WAN communications circuit; and
- (ii) sending said request for the showing times pertaining to said at least one specific property to the second wireless portable computer for further action.

20. The method of claim 18, wherein:

(a) said second wireless portable computer includes a third processing circuit, a third memory circuit that includes instructions executable by said third processing circuit, a third display, a user operated second data entry circuit, and a third WAN communications circuit for communicating with said wide area network; and (b) at said second wireless portable computer, said third WAN communications circuit is used to receive said request for a showing time pertaining to said at least one specific property.

* * * * *